United States Patent Office 3,288,417
Patented Nov. 29, 1966

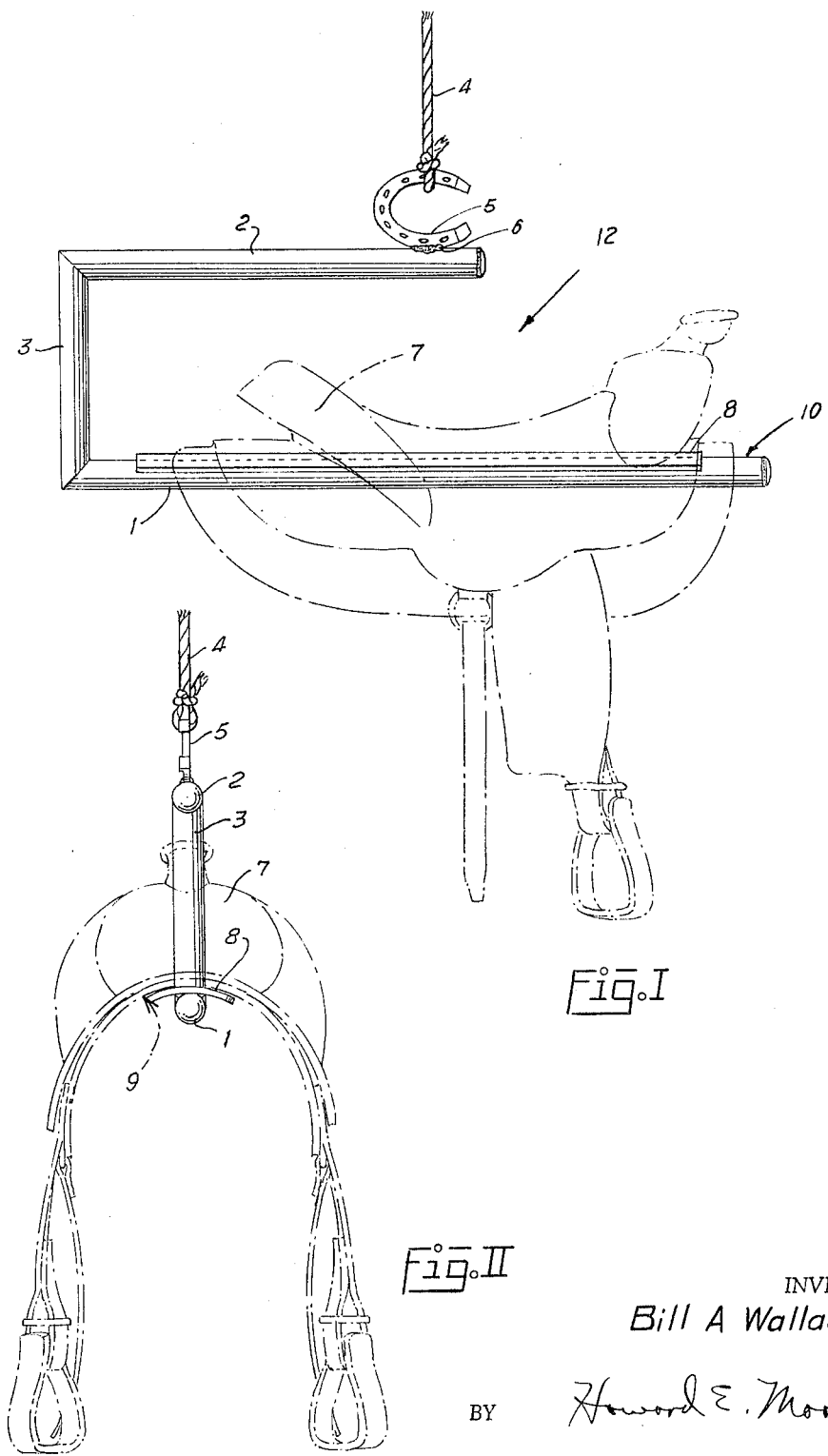

3,288,417
SADDLE RACK
Bill A. Wallace, P.O. Box 296, Wylie, Tex.
Filed Sept. 28, 1965, Ser. No. 490,803
1 Claim. (Cl. 248—317)

This invention is concerned with a saddle rack on which saddles can be stored, and is particularly concerned with a saddle rack on which a saddle may be quickly and easily suspended and from which the saddle may be quickly and easily removed and dropped upon the horse, and which maintains the shape of the saddle in a suspended position away from the forages of rats and other predatory animals.

Saddles have been customarily stored by hanging them on a hook suspended to the wall, throwing them over a stall rail or throwing them on the ground or floor. No satisfactory saddle suspension member has been heretofore provided which will suspend the saddle off the ground in a position where it will maintain its original shape and will be free from the attacks of predatory animals, such as rats, and on which the saddle may be quickly and easily stored and removed therefrom.

It is, therefore, a primary object of the invention to provide a saddle rack which is suspended off the floor or ground and on which a saddle may be quickly disposed and removed therefrom.

It is a further object of the invention to provide a very simple, inexpensive, yet efficient and useful saddle rack which preserves the original shape of the saddle and on which, and from which, the saddle may be quickly disposed or removed.

A further object of the invention is to provide a saddle rack having a lower rail and a balance bar connected in parallel, spaced relationship, the lower rail extending beyond the end of the balance bar, and a suspension member connected to the balance bar substantially centrally of the lower rail whereby the rail may be tilted to dispose the saddle thereon, and the saddle provides a balancing weight for the balance bar to maintain the device in horizontal position, and which may be quickly removed by exerting slight pressure on the outer ends of the saddle rail to overcome the balanced condition of the balance bar to allow the saddle to be slid off the rail.

Other and further objects of the invention will become apparent upon reading the detailed specification hereinafter following and by referring to the drawing annexed hereto.

A suitable embodiment of the invention is disclosed in the attached drawing wherein, FIGURE I is a side elevational view of the saddle rack with a saddle mounted thereon, as shown in broken lines; and FIGURE II is a front elevational view of the saddle rack with a saddle thereon shown in broken lines.

Numerical references are employed to indicate the various parts shown in the drawing and like numerals indicate like parts throughout the various figures of the drawing.

Th saddle rack is comprised of a horizontal rail 1, and a spaced, parallel rail or balance bar 2 which are connected and closed at the inner end by a connector bar 3, thus providing spaced parallel, horizontal members 1 and 2 and a closed end 3 with an open end 12. The bars 1, 2, and 3 may be made of any desired material, such as metallic tubular material, or they could be made of square or flat stock or any other suitable shape and type of material.

The saddle rack is suspended to the ceiling or a rafter or other support member by means of a rope, cord, wire, or other flexible support. Preferably it is suspended in a position away from a wall, stall, rail, or the like, so that rats, mice, and other varmints cannot get to the saddle stored thereon and damage same.

The rope 4 is attached to a suitable suspension member 5 which is secured adjacent the outer end of the balance bar 2. For ornamentation purposes the suspension member 5 may be shaped as a horse-shoe, but of course, can be a hook, eye, or other suspension bracket. As shown, it is welded to the balance bar 2, but could be attached by a bolt or other suitable means.

It is important to note however, that the attachment member 6 is attached substantially centrally of the length of the support rail 1 as indicated at 6, or at least it is attached at the center of gravity of the saddle rack. Preferably the balance bar 2 terminates short of the outer end of the rail 1 so as to permit the saddle 7 to be thrown upon the rail without engaging the balance bar 2.

Thus, without any weight or force imposed upon the outer end of the rail 1 the saddle rack will be balanced in horizonal position on the suspension member 4.

An elongated, arcuate plate 8 is preferably disposed upon the upper surface of the support rail 1, which conforms to the arcuate under surface 9 of the saddle 7 so that the saddle is supported in a manner to prevent distortion thereof by the weight imposed thereupon while suspended on the rail 1.

The rail 1 includes an outwardly extending end 10 which may be first engaged with the saddle as it is thrown upon the rail 1.

The operation and function of the saddle rack hereinbefore described is as follows:

When it is desired to place a saddle upon the support rail 1 the saddle may be picked up and the rear end thereof may be contacted with the outer end 10 of the rail 1 and the force exerted thereby, will counter-balance the saddle rack and cause the outer end 10 to tilt downwardly. The saddle may then be lifted as it is moved upwardly on the rail until it reaches a point where the center of gravity thereof is substantially in alignment with the center of gravity 6 of the saddle rack. It may then be released and the saddle will counter-balance the rack so that it will be suspended in horizontal position. In order to remove the saddle from the rack it is simply necessary to exert a slight downward force on the outer end 10 of the rail 1 to thereby counter-balance or overcome the balance of the saddle on the rail, which will cause the outer end 10 to tilt downwardly to permit the saddle to be easily slid off the rail 1. It may be disposed at such a height that it may be dropped directly upon the back of the horse which has been led underneath the saddle rack. It will be observed that the outer end 10 of the rail 1 extends outwardly beyond the outer end of the balance bar 2, so that the saddle will freely contact said outer end without coming into engagement with the balance bar 2 to allow it to be slid upon the rail 1.

It will thus be seen that I have provided a saddle rack which is inexpensive to manufacture, on which is easy to dispose a saddle and remove same therefrom, which suspends the saddle off the ground or floor away from predatory animals, and from which the saddle may be dropped upon the back of a horse.

It will be understood that other and further embodiments of my invention may be devised without departing from the spirit and scope of the appended claim.

Having described my invention I claim:

In a saddle rack; a horizontal support rail, a horizontal balance rail spaced from the horizontal rail and being in parallel alignment therewith; a transverse member connecting the ends of the support rail and balance rail, leaving the other ends of the support rail and balance rail free; the balance rail and support rail being spaced apart sufficiently to receive a saddle; the balance rail being shorter than the support rail to allow the free end of the support rail to extend beyond the end of the balance rail; a suspension member secured to the balance rail at the center of gravity of the saddle rack; and an elongated arcuate member attached along the upper surface of the support rail which conforms to the arcuate inner surface of a saddle when placed thereon which is of sufficient width and length to balance a saddle against sidewise tilting and to prevent distortion of the saddle by the weight thereupon when positioned on the support rail.

References Cited by the Examiner

UNITED STATES PATENTS

| | | | |
|---|---|---|---|
| D. 183,640 | 9/1958 | Van Dusen | D80—8 |
| 955,260 | 4/1910 | Getman | 248—89 |
| 1,127,397 | 2/1915 | Boyajian | 248—331 X |
| 1,846,377 | 2/1932 | Watson | 211—35 |
| 1,926,201 | 9/1933 | Kahns | 211—32 |
| 2,093,802 | 9/1937 | Brown | 211—35 |
| 2,192,167 | 3/1940 | Bagley et al. | 211—113 |
| 2,362,137 | 11/1944 | Kagan | 248—317 |
| 2,532,255 | 11/1950 | Davis | 248—215 |
| 2,910,215 | 10/1959 | Auten | 223—98 |
| 2,936,148 | 5/1960 | Gralewicz | 248—308 |
| 2,937,759 | 5/1960 | Smith | 211—32 |
| 2,987,289 | 6/1961 | Wamsley | 248—341 |

FOREIGN PATENTS 750,581   5/1933   France.

CLAUDE A. LE ROY, *Primary Examiner.*